United States Patent
Orbach

(10) Patent No.: US 9,654,625 B1
(45) Date of Patent: May 16, 2017

(54) COMMUNICATION MONITORING SYSTEMS AND METHODS

(71) Applicant: Tech-Friends Ltd., Jerusalem (IL)

(72) Inventor: Levi Yitzchak Orbach, Jerusalem (IL)

(73) Assignee: TECH-FRIENDS LTD., Jerusalem (IL)

(*) Notice: Subject to any disclaimer, the term of this patent is extended or adjusted under 35 U.S.C. 154(b) by 0 days.

(21) Appl. No.: 14/732,826

(22) Filed: Jun. 8, 2015

Related U.S. Application Data

(60) Provisional application No. 62/009,930, filed on Jun. 10, 2014.

(51) Int. Cl.
| | |
|---|---|
| *H04M 1/64* | (2006.01) |
| *H04M 3/42* | (2006.01) |
| *H04M 3/493* | (2006.01) |
| *H04M 3/38* | (2006.01) |

(52) U.S. Cl.
CPC ....... *H04M 3/42221* (2013.01); *H04M 3/385* (2013.01); *H04M 3/4936* (2013.01)

(58) Field of Classification Search
CPC ................................................. H04M 3/42221
See application file for complete search history.

(56) References Cited

U.S. PATENT DOCUMENTS

| | | | |
|---|---|---|---|
| 8,351,581 B2* | 1/2013 | Mikan | H04M 3/42221 379/88.14 |
| 8,412,527 B2* | 4/2013 | Melamed | G06F 17/2881 379/88.01 |
| 8,554,563 B2* | 10/2013 | Aronowitz | G10L 17/02 704/245 |
| 8,752,141 B2* | 6/2014 | Gross | A63F 13/12 726/5 |
| 8,886,663 B2* | 11/2014 | Gainsboro | G06F 17/30398 379/88.01 |
| 9,143,610 B2* | 9/2015 | Hodge | H04M 1/67 |
| 9,171,547 B2* | 10/2015 | Watson | G10L 15/32 |
| 9,286,511 B2* | 3/2016 | Chung | G06K 9/00362 |
| 9,401,145 B1* | 7/2016 | Ziv | G10L 15/26 |
| 9,444,939 B2* | 9/2016 | Ryan | H04M 3/5183 |
| 2007/0071206 A1* | 3/2007 | Gainsboro | H04M 3/2281 379/168 |

* cited by examiner

*Primary Examiner* — Joseph T Phan
(74) *Attorney, Agent, or Firm* — JMB Davis Ben-David

(57) ABSTRACT

A computerized system comprising: (a) a compliance server adapted to receive an audio feed of a telephone conversation; (b) an identification module adapted to compare said audio feed to a database of voice prints and identify participants in said telephone conversation; and (c) an analysis module adapted to ascertain a subject of said telephone conversation.

11 Claims, 12 Drawing Sheets

You appear to be negotiating a trade with Ms. Alicia Ackerman on swap123.
 Is that correct?
    YES  ○
    NO   ○

You appear to be negotiating a trade with Mr. Philip Phips on swap123.

Is that correct?
    YES  ○
    NO   ○

> You appear to be negotiating a trade on swap123.
> Is that correct?
>   YES ○
>   NO ○
> Are you speaking to:
> ○ Ms. Alicia Ackerman
> ○ Mr. Robert Roberts
> ○ Mr. Felix Fox
> ○ None of the above

> Please enter the name of the trade you are negotiating:
>
>   *Free text field (508)*
>
> Please enter the name of the person you are speaking to:
>
>   *Free text field (510)*

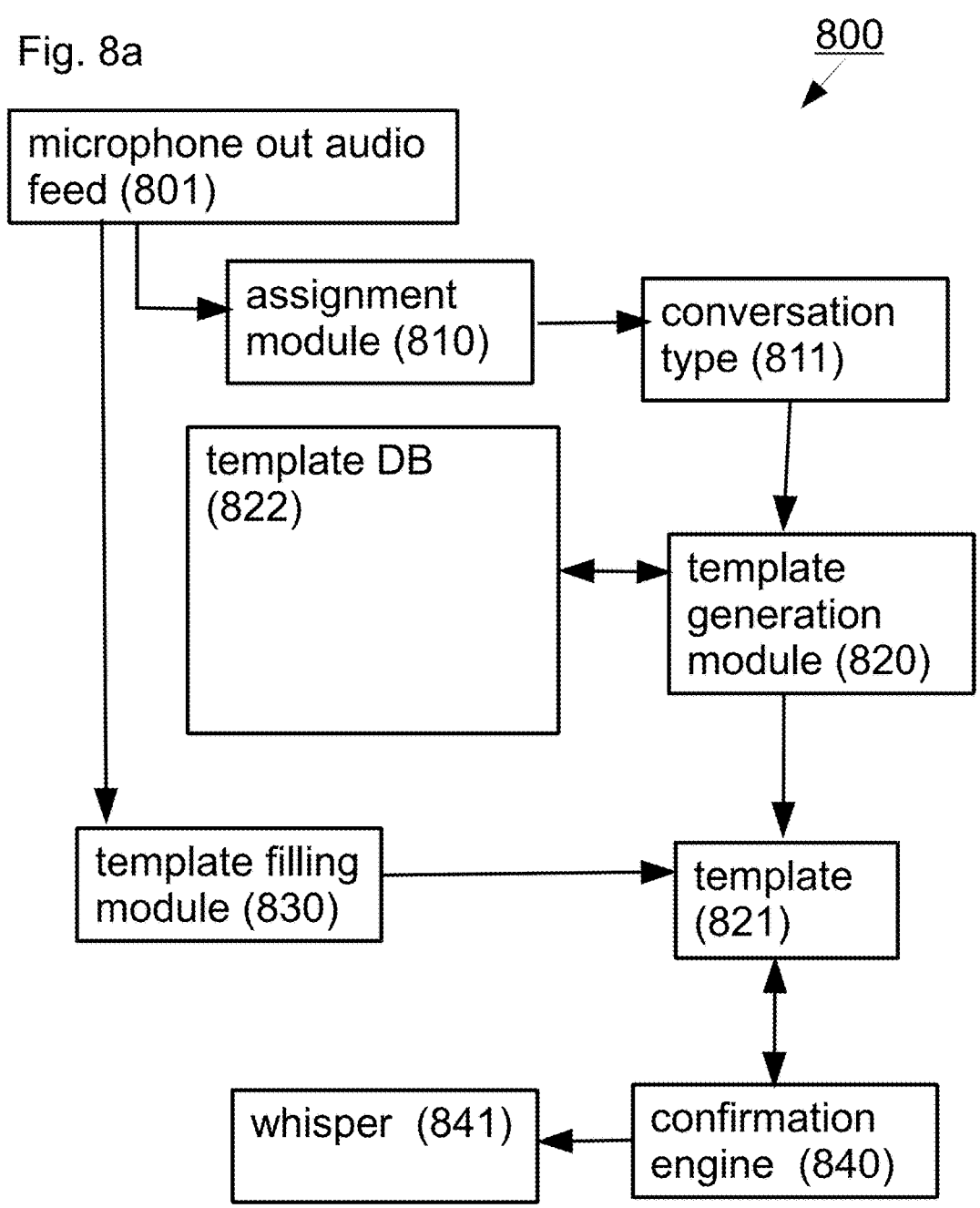

COMMUNICATION MONITORING SYSTEMS AND METHODS

RELATED APPLICATIONS

This application claims the benefit according to 35 U.S.C. §119(e) of provisional patent application U.S. 62/009,930 filed Jun. 10, 2014 and having the same title and inventors as the present application.

FIELD OF THE INVENTION

The invention is in the field of record keeping.

BACKGROUND OF THE INVENTION

In January of 2010 the United States passed the "Dodd-Frank Wall Street Reform and Consumer Protection Act". This Act requires that "all related records (including related cash and forward transactions) and recorded communications, including electronic mail, instant messages, and recording of telephone call" be stored for a year. The Act went into effect in December 2012.

U.S. CFTC (Commodity Futures Trading Commission) regulation 1.35 also imposes record keeping requirements for transaction related telephone communications on financial institutions.

SUMMARY OF THE INVENTION

One aspect of some embodiments of the invention relates to use of voice recognition to identify participants in a conversation. In some exemplary embodiments of the invention, employees of financial institutions provide sample voice recordings which are stored in a database for future use. Alternatively or additionally, in some embodiments voice-prints obtained from a recorded call which do not match any voice recordings stored in the database are assigned the phone number from which they originate as an identifier. In some embodiments, a lookup table is used to translate phone numbers to names. In some embodiments, if the name associated with a phone number already has a sample voice recording in the database, one or more additional voice recordings originating from the same number are assigned an auxiliary designation such as "Mr. John Doe (assistant)" or "Ms. Jane Doe (staff)".

Another aspect of some embodiments of the invention relates to assignment of a unique identifier (UID) to recordings maintained by all participants in a conversation. In some embodiments, use of conversation UIDs contributes to coordination of records provided by two parties (e.g. a buyer and a seller) to a regulatory agency.

In some exemplary embodiments of the invention, participants in a conversation are shown an input screen during and/or after the conversation. In some embodiments, at least some fields on the input screen are automatically populated. In some embodiments, automatic population relies on information in the database on the participants in the conversation, the institutions they are associated with and their previous trade history. Alternatively or additionally, in some embodiments participants in the conversation are prompted to populate unpopulated fields and/or verify populated fields. In some embodiments, participants on both (or all) sides of the conversation must agree on population of the fields in the input screen before the field population data is stored. Alternatively or additionally, in some embodiments field population data serve as tags for a search engine to use in identifying conversations associated with a particular transaction. Alternatively or additionally, in some embodiments if participants in a conversation agree on a trade, the field population data is stored. Alternatively or additionally, in some embodiments if participants in a conversation do not agree on a trade, a message is sent by the system to compliance personnel for a manual review of the conversation in question.

Another aspect of some embodiments of the invention relates to a search engine adapted to retrieve all recordings pertaining to a particular transaction from a database of stored recordings. In some embodiments, implementation of such a search engine relies on UIDs assigned to the recordings. In some embodiments, the UIDs include transaction name. In other exemplary embodiments of the invention, the UIDs do not include transaction names and a look-up table is employed to correlate UIDs (and their corresponding recordings) with a specific transaction.

Another aspect of some embodiments of the invention relates to relying on microphone out audio feeds from multiple participants in a telephone conversation to analyze the conversation. According to various exemplary embodiments of the invention use of microphone out audio feeds contributes to an increase in analysis accuracy whether by direct speech analysis or by analysis of text generated by speech to text transformation.

Another aspect of some embodiments of the invention relates to presentation of a summary template to participants in said conversation. In some exemplary embodiments of the invention, the fields of the template self-populate during the conversation.

Another aspect of some embodiments of the invention relates to a GUI including icons which elicit information inputs from the user. For example: one disconnect icon indicating transaction completed and another disconnect icon indicating transaction not completed; or one call icon indicating pending transaction and another call icon indicating new transaction.

Another aspect of some embodiments of the invention relates to use of whispered prompts to elicit confirmation of details from participants in a conversation.

In some exemplary embodiments of the invention, implementation of such a search engine contributes to uniform disclosure of communications regarding a specific transaction to regulatory authorities by all parties concerned with the transaction.

As used in this specification and the accompanying claims the term "database" includes any collection of digital files accessible to a search engine. According to various exemplary embodiments of the invention databases are stored on a conventional server and/or in a cloud.

As used in this specification and the accompanying claims the term "server" indicates any computer and/or program in a network which provides files and services that are used by one or more other computers and/or programs in the network.

As used in this specification and the accompanying claims the terms "record", "recording" or "recordings" and their conjugates refer to audio data stored in a digital format. In some embodiments of the invention, a recording has non-audio data associated with it (e.g. UIDs). Recording includes both preparation of a digital file using output from an analog to digital converter (ADC) as well as transmission of an output signal from the ADC across a network (e.g. VOIP).

As used in this specification and the accompanying claims the term "telephone conversation" includes conversations conducted using the public switched telephone network (PSTN), a cellular network, a satellite network a voice over Internet Protocol (VOIP) or any combination thereof. Both voice only and video conferences using any of the above network types or combinations thereof are within the scope of "telephone conversation".

Still another aspect of some embodiments of the invention relates to conversion of recordings and/or audio streams to text. Conversion to text is accomplished, for example, using existing speech to text software. According to these embodiments, a search engine can search for conversations related to a specific transaction using text strings. In some embodiments, a text file remains linked to the recording from which it was transcribed.

It will be appreciated that the various aspects described above relate to solution of technical problems associated with compliance with provisions of the "Dodd-Frank Wall Street Reform and Consumer Protection Act".

Alternatively or additionally, it will be appreciated that the various aspects described above relate to solution of technical problems related to accurate retrieval of communications records associated with a particular subject (e.g. a specific financial transaction).

Alternatively or additionally, it will be appreciated that the various aspects described above relate to solution of technical problems related to automated logging of transaction details for a transaction conducted verbally.

In some exemplary embodiments of the invention there is provided a system including: (a) a compliance server adapted to receive an audio feed of a telephone conversation; (b) an identification module adapted to compare the audio feed to a database of voice prints and identify participants in the telephone conversation; and (c) an analysis module adapted to ascertain a subject of the telephone conversation. In some embodiments the telephone conversation is in progress. Alternatively or additionally, in some embodiments the telephone conversation has been concluded. Alternatively or additionally, in some embodiments the analysis module analyzes the audio feed directly. Alternatively or additionally, in some embodiments the analysis module relies exclusively on microphone out audio feeds. Alternatively or additionally, in some embodiments the sytem includes a speech to text converter which converts the audio stream to a text output. Alternatively or additionally, in some embodiments the analysis module analyzes the text output to ascertain the subject of the telephone conversation. Alternatively or additionally, in some embodiments the system includes a co-ordination module which associates a unique identifier (UID) with each audio stream and transmits the UID to at least one institution represented in the telephone conversation. Alternatively or additionally, in some embodiments the system includes: a co-ordination module which associates a unique identifier (UID) with each audio stream; and a storage module which stores the audio stream/UID pair and grants access to the pair to at least one institution represented in the telephone conversation. Alternatively or additionally, in some embodiments the system includes: a verification module adapted to require at least one participant in the telephone conversation to identify the other participant(s) in the conversation and the subject of the conversation. Alternatively or additionally, in some embodiments the system includes: a certification engine adapted to generate a certified copy of the telephone conversation in response to a request from an institution that participated in the conversation. Alternatively or additionally, in some embodiments the system includes: a query engine adapted to provide a response to a query containing a UID. Alternatively or additionally, in some embodiments the query engine is adapted to generate a hierarchical listing of all records associated with a specific UID. Alternatively or additionally, in some embodiments the system includes: a template generation module adapted to retrieve a template from a template database based on the subject of the conversation and present the template to all participants in the conversation during the conversation; and a template filling module configured to receive audio feed from at least one participant in the telephone conversation and populate fields in the template with details from the conversation prior to conclusion of the conversation.

In some exemplary embodiments of the invention there is provided (a) a router adapted to route audio feeds of telephone conversations to a compliance server; and (b) a cataloging module adapted to associate a UID provided by the compliance server with each of the telephone conversations, wherein the UID is associated with participants in a conversation and a subject of the conversation. In some exemplary the system includes an archive containing recordings of the audio feeds of the telephone conversations. Alternatively or additionally, in some embodiments the system includes a verification interface adapted to require at least one participant in a telephone conversation associated with a UID to identify the other participant(s) in the conversation and the subject of the conversation.

In some exemplary embodiments of the invention there is provided method including: (a) receiving an audio feed of a telephone conversation in progress; (b) ascertaining the telephone numbers of participants in the conversation; and (c) causing a user interface to appear on a device owned by at least one of the participants in the conversation. In some embodiments the ascertaining comprises using a look-up table of IP addresses associated with telephone numbers. Alternatively or additionally, in some embodiments the causing comprises remote launching of an application. Alternatively or additionally, in some embodiments the causing comprises transmission of an SMS to a mobile phone. Alternatively or additionally, in some embodiments a compliance server performs the receiving.

In some exemplary embodiments of the invention there is provided a method including:
(a) separately recording a microphone out audio feed from each participant in a telephone conversation and transmitting the recordings to a server; and (b) integrating the microphone out audio feed from each participant in the telephone conversation to produce a unified record of the telephone conversation. In some embodiments the unified record includes an audio recording. Alternatively or additionally, in some embodiments the method includes separately recording a speaker in audio feed from each participant in the telephone conversation and transmitting the recordings to the server. Alternatively or additionally, in some embodiments the integrating includes matching a speaker in audio feed from one participant in the telephone conversation with a microphone out audio feed of another participant at the server. Alternatively or additionally, in some embodiments the method includes: adding a common time indicator to the microphone out audio feeds from each participant in the telephone conversation, wherein the integrating includes assembling microphone out audio feeds of all participants in the conversation using sequential assembly of the common time indicator. Alternatively or additionally, in some embodiments the method includes: performing a speech to text transformation on the recordings; wherein the unified record includes a text transcript.

In some exemplary embodiments of the invention there is provided a computer system comprising: (a) an assignment module configured to receive a microphone out audio feed from at least one participant in a telephone conversation and assign a conversation type to the conversation; and (b) a template generation module adapted to retrieve a template from a template database based on the conversation type and present the template to all participants in the conversation during the conversation; and (c) a template filling module configured to receive the microphone out audio feed from at least one participant in the telephone conversation and populate fields in the template with details from the conversation prior to conclusion of the conversation. In some embodiments the assignment module is configured to receive microphone out audio feeds from two or more participants in the telephone conversation and compare them before assigning the conversation type. Alternatively or additionally, in some embodiments the system includes a confirmation engine adapted to whisper at least one of the details from the conversation to at least one of the participants prior to conclusion of the conversation and request confirmation. Alternatively or additionally, in some embodiments the confirmation engine requires input from two or more participants in the conversation.

In some exemplary embodiments of the invention there is provided a computer system including: (a) a videoconferencing server in concurrent communication with all participants in a telephone conversation pertaining to a transaction; and (b) a confirmation module which provides a graphical user interface (GUI) includes: (i) one disconnect icon indicating transaction completed; and (ii) another disconnect icon indicating transaction not completed; to at least one participant in the conversation. Alternatively or additionally, in some embodiments the system includes: a deal tracking module designed and configured to offer an opportunity to complete a transaction by providing a graphical user interface (GUI) includes: (i) one call icon indicating pending transaction to a user initiating a call to a contact with whom the user has an incomplete transaction pending; and (ii) another call icon indicating new transaction.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the methods and systems according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 5a is an exemplary verification dialog box for a first party in a transaction according to an exemplary embodiment of the invention;

FIG. 5b is an exemplary verification dialog box for a second party in a transaction according to an exemplary embodiment of the invention;

FIG. 5c is an exemplary verification dialog box with multiple choice format according to an exemplary embodiment of the invention;

FIG. 5d is an exemplary verification dialog box with free text fields according to an exemplary embodiment of the invention;

FIG. 8a is a simplified schematic representation of a computer system according to some exemplary embodiments of the invention;

DETAILED DESCRIPTION OF EMBODIMENTS

Embodiments of the invention relate to systems and methods for communications monitoring. Specifically, some embodiments of the invention are used to log details of a verbal transaction and/or to assure institutional compliance with applicable recordkeeping regulations.

The principles and operation of a system and/or methods according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Overview

Figure 1:
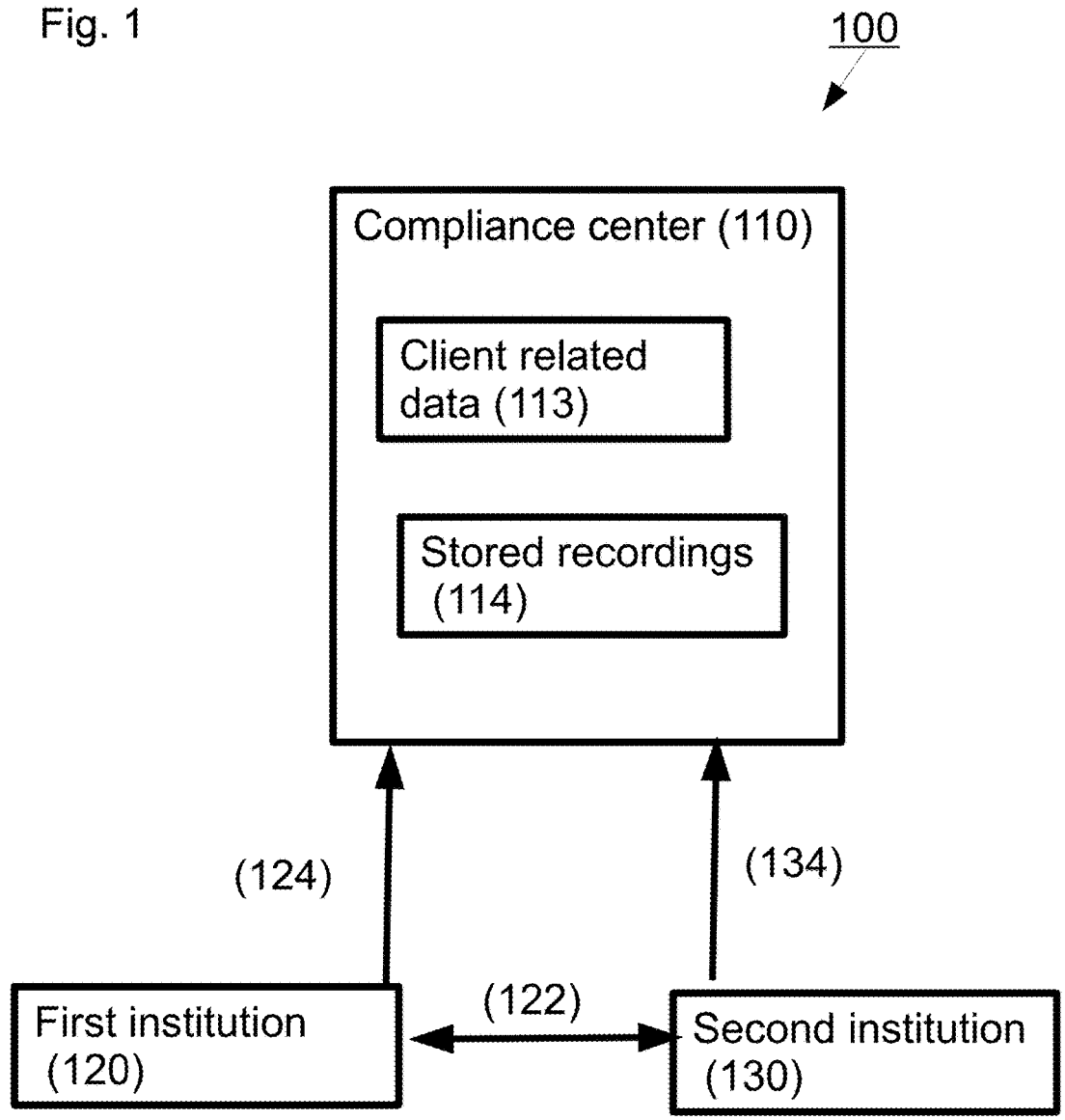
FIG. 1 is a schematic overview depicting an exemplary context in which various exemplary embodiments of the invention operate.

FIG. 1 is a schematic overview depicting an exemplary systemic context in which various exemplary embodiments of the invention operate indicated generally as 100. Systemic context 100 includes a compliance center 110 and a plurality of institutions communicating with one another by telephone (e.g. concerning financial transactions). For simplicity, only two institutions (first institution 120 and second institution 130) are depicted although in actual practice a much larger number of institutions may be served by compliance center 110.

In the normal course of business a specific individual at first institution 120 initiates a telephone call 122 to a specific individual at second institution 130. Call 122 concerns a specific financial transaction being negotiated. First institution 120 provides a duplicate audio stream 124 of call 122 to compliance center 110 as part of a pre-existing service agreement between center 110 and institution 120.

If second institution 130 also has a pre-existing service agreement with center 110, that institution also provides a duplicate audio stream 134 of call 122 to compliance center 110.

Within the framework of the service agreements between compliance center 110 and institutions 120 and/or 130, center 110 maintains a database of client related data 113. According to various exemplary embodiments of the invention client related data 113 includes, but is not limited to, employee names, voice prints for each employee, institutional telephone numbers assigned to each employee, IP addresses of computers assigned to each employee and/or mobile telephone numbers belonging to each employee and/or e-mail addresses of each employee.

Alternatively or additionally, in some embodiments compliance center 110 maintains an archive of stored recordings 114 of audio streams 124 and/or 134.

Alternatively or additionally, compliance center 110 uses human personnel to monitor audio streams 124 and/or 134 (e.g. using listening stations equipped with earphones).

A more detailed explanation of how compliance center uses data 113 to analyze audio streams 124 and/or 134 and provide compliance services to institutions 120 and/or 130 is provided hereinbelow.

In some exemplary embodiments of the invention, audio streams 123 and 124 are provided as microphone out audio feeds.

Exemplary Compliance Center System

Figure 2:
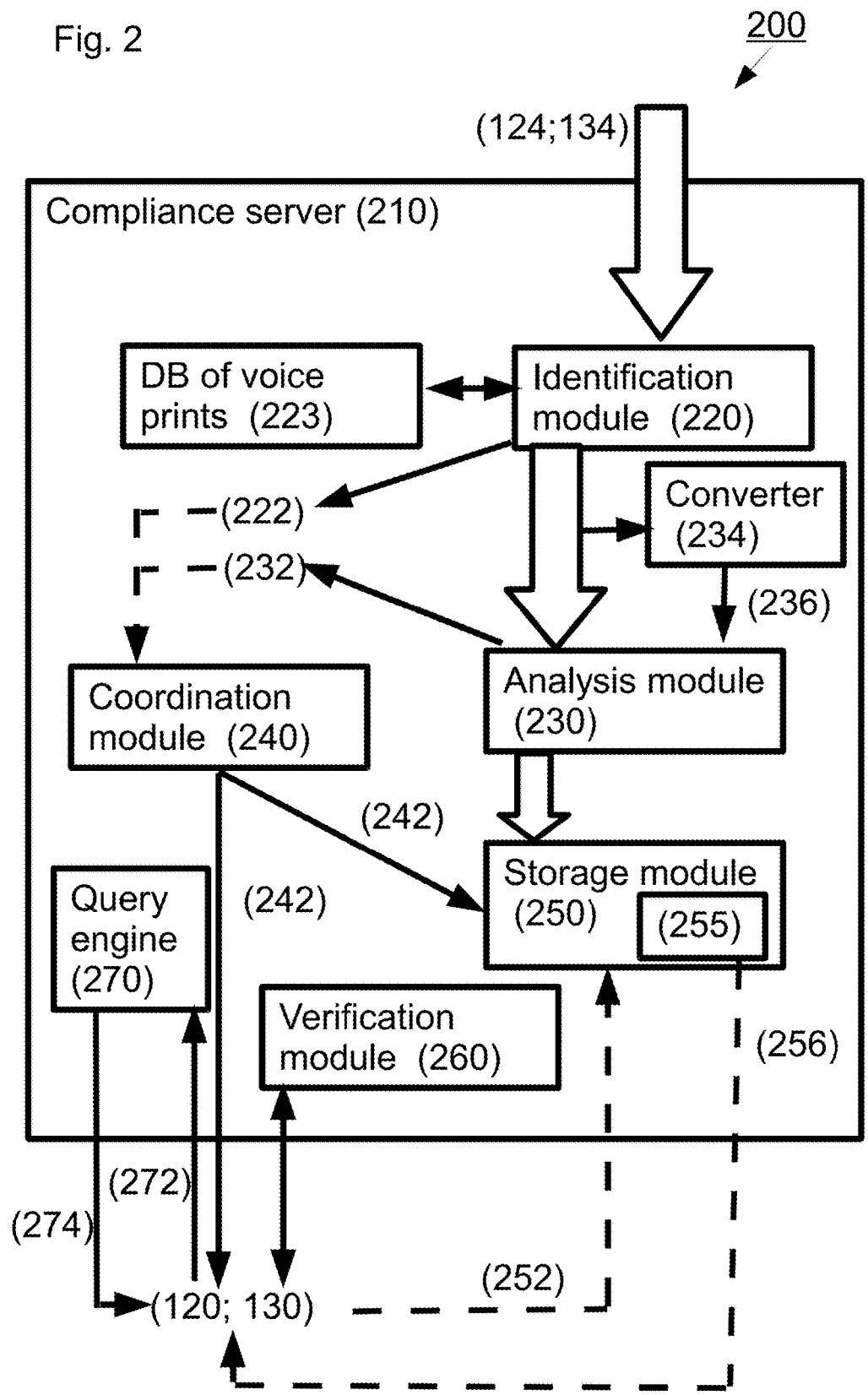
FIG. 2 is a schematic diagram depicting system according to some exemplary embodiments of the invention.

FIG. 2 is a schematic diagram depicting a system, identified generally as 200, for monitoring and cataloging telephone calls by participant(s) and/or by subject according to some exemplary embodiments of the invention.

Depicted exemplary system 200 includes a compliance server 210 (e.g. at center 110 in FIG. 1) adapted to receive an audio feed 124 and/or 134 of a telephone conversation (e.g. 122 in FIG. 1). In some exemplary embodiments of the invention, audio streams 123 and 124 are provided exclusively as microphone out audio feeds. In some embodiments use of microphone out audio feeds contributes to an increase in signal clarity and/or contributes to an improvement in performance of module 220 and/or contributes to an improvement in performance of module 230. For purposes of this specification and the accompanying claims the term "audio feed" (e.g. Microphone out audio feed" include digital files corresponding to analog audio streams.

In the depicted exemplary embodiment, audio feed 124 and/or 134 is processed by an identification module 220 adapted to compare the audio feed to a database 223 of voice prints and identify participants 222 in telephone conversation 122 (FIG. 1). In order to conserve system resources non-voice client related data 113 is often used to "guess" which voice prints to check first. For example, audio stream 124 is tagged in some cases with the phone number that originated the call and/or the phone number dialed. In some embodiments, client related data includes the names of employees associated with these phone numbers. The employees associated with these phone numbers and/or their administrative assistants will be the system's first "guess" for voice print comparison.

Depicted exemplary system 200 also includes an analysis module 230 adapted to ascertain a subject 232 of telephone conversation 122.

According to various exemplary embodiments of the invention identification module 220 and/or analysis module 230 are operated on a telephone conversation in progress or on a telephone conversation which has been concluded (e.g. an archived recording).

In some embodiments, analysis module 230 analyzes audio feed (124 and/or 234) directly. Alternatively or additionally, in some embodiments system 200 includes a speech to text converter 234 which converts the audio stream to a text output 236. In some embodiments, analysis module analyzes text output 236 to ascertain subject 232 of the telephone conversation.

In some embodiments, system 200 includes a co-ordination module 240 which associates a unique identifier (UID) 242 with each audio stream and transmits the UID to at least one institution (e.g. 120 and/or 130) represented in the telephone conversation. If both participating institutions have service agreements with center 110, both will receive the UID.

In some embodiments, system 200 includes a co-ordination module 240 which associates a unique identifier (UID) 242 with each audio stream and a storage module 250 which stores each audio stream/UID pair and grants access 252 to the pair to at least one institution (e.g. 120; 130 in FIG. 1) represented in the telephone conversation. If both participating institutions have service agreements with center 110, both will be granted access 252.

In some embodiments, system 200 includes a certification engine 255 adapted to generate a certified copy 256 of the telephone conversation in response to a request from an institution (e.g. 120 and/or 130) that participated in the conversation. According to various exemplary embodiments of the invention the certified copy includes a digital recording and/or a text transcript. Alternatively or additionally, certification is to the identity of the participants in the conversation and/or the subject of the conversation. Alternatively or additionally, in some embodiments certification engine 255 adapted to generate a certified copy 256 of the telephone conversation in response to a request from a regulatory agency.

Although the above explanation describes a scenario with two institutions participating in a telephone call, the same principles are applicable to calls among three, four or more participating institutions.

In many exemplary embodiments of the invention, system 200 includes a verification module 260 adapted to require at least one participant (e.g. from institution 120 or 130) in the telephone conversation to identify the other participant(s) in the conversation and the subject of the conversation. Again, if both participating institutions have service agreements with center 110, participants from both institutions will be asked to verify participants 222 and subject 232.

In some embodiments, system 200 includes a query engine 270 adapted to provide a response 274 to a query 272 containing a UID 242. In the depicted exemplary embodiment, query 272 originates from one of institutions 120/130. In other exemplary embodiments of the invention, query 272 originates from a regulatory agency (not depicted). According to those embodiments, response 274 goes to the (undepicted) regulatory agency. According to various exemplary embodiments of the invention queries 272 relate to the nature of the transaction and/or other UIDs related to the same transaction (e.g. "Was this transaction culminated?" or "Were there any UIDs in this transaction prior to this one.")

In some embodiments, query engine 270 is adapted to generate a hierarchical listing (e.g. sorted by date/time) of all records associated with a specific UID.

Alternatively or additionally, in some embodiments system 200 includes a template generation module 820 (depicted in Fig and described in the accompanying text for that figure) adapted to retrieve a template (821; FIG. 8) from a template database (822; FIG. 8) based on the subject of the conversation and present template 821 to all participants in conversation during the conversation and a template filling module 830 (depicted in FIG. 8 and described in the accompanying text for that figure) configured to receive audio feed from at least one participant in the telephone conversation and populate fields in template 821 with details from the conversation prior to conclusion of the conversation.

Exemplary Alternative Communications Flow

Referring again to FIG. 1, in some embodiments of the invention call 122 itself passes through compliance center 110 on its way from institution 120 to institution 130. According to these embodiments call 122 replaces audio feeds 124 and/or 134 at compliance server 201 (FIG. 2).

Exemplary Financial Institution System

Figure 3:
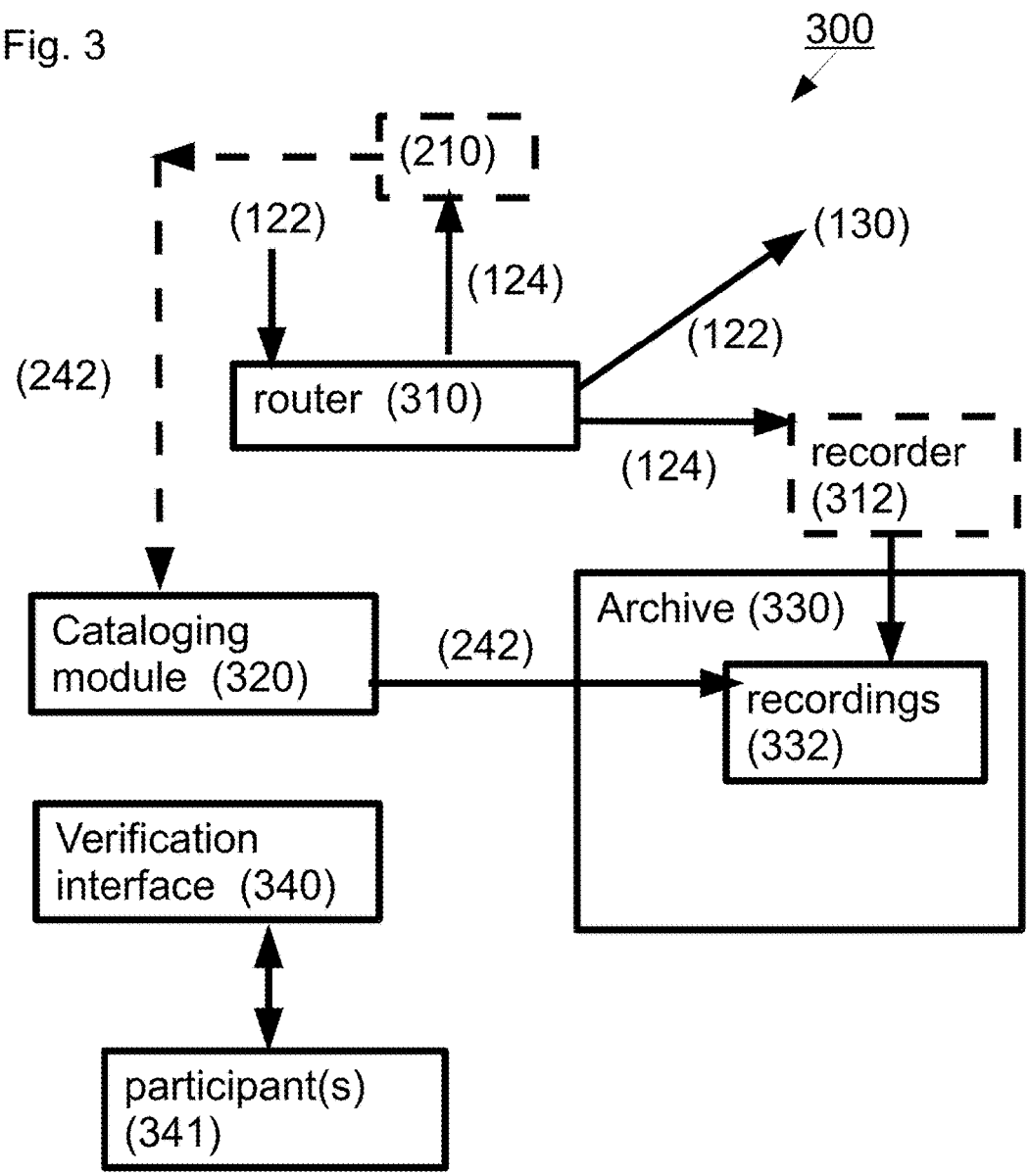
FIG. 3 is a schematic diagram depicting system according to some exemplary embodiments of the invention.

FIG. 3 is a schematic diagram depicting a system, identified generally as 300, for monitoring and cataloging telephone calls by participant(s) and/or by subject according to some exemplary embodiments of the invention.

Depicted exemplary system 300 includes a router 310 adapted to route audio feeds (e.g. 124) of telephone conversations (e.g. 122) to a compliance server 210. It is stressed that server 210 is not part of system 300, although it does interact with system 300. The telephone call itself (122) proceeds to its intended destination (130) through normal channels. In the depicted exemplary embodiment, router 210 also sends audio stream 124 to recorder 312. Recorder 312 makes a recording 332 of stream 124.

In the depicted exemplary embodiment, system 300 includes a cataloging module 320 adapted to associate a UID 242 provided by compliance server 210 with each of the telephone conversations. The UID is associated with participants in a conversation and a subject of the conversation.

In some embodiments, system 300 includes an archive 330 containing recordings 332 of the audio feeds (e.g. 124) of the telephone conversations (e.g. 122). According to various exemplary embodiments of the invention archive 300 is instead of or in addition to storage module 250 in system 200.

In the depicted exemplary embodiment, system 300 includes a verification interface 340 adapted to require at least one participant 341 in a telephone conversation associated with a UID 242 to identify the other participant(s) in the conversation and the subject of the conversation.

Exemplary Verification Method

Figure 4:
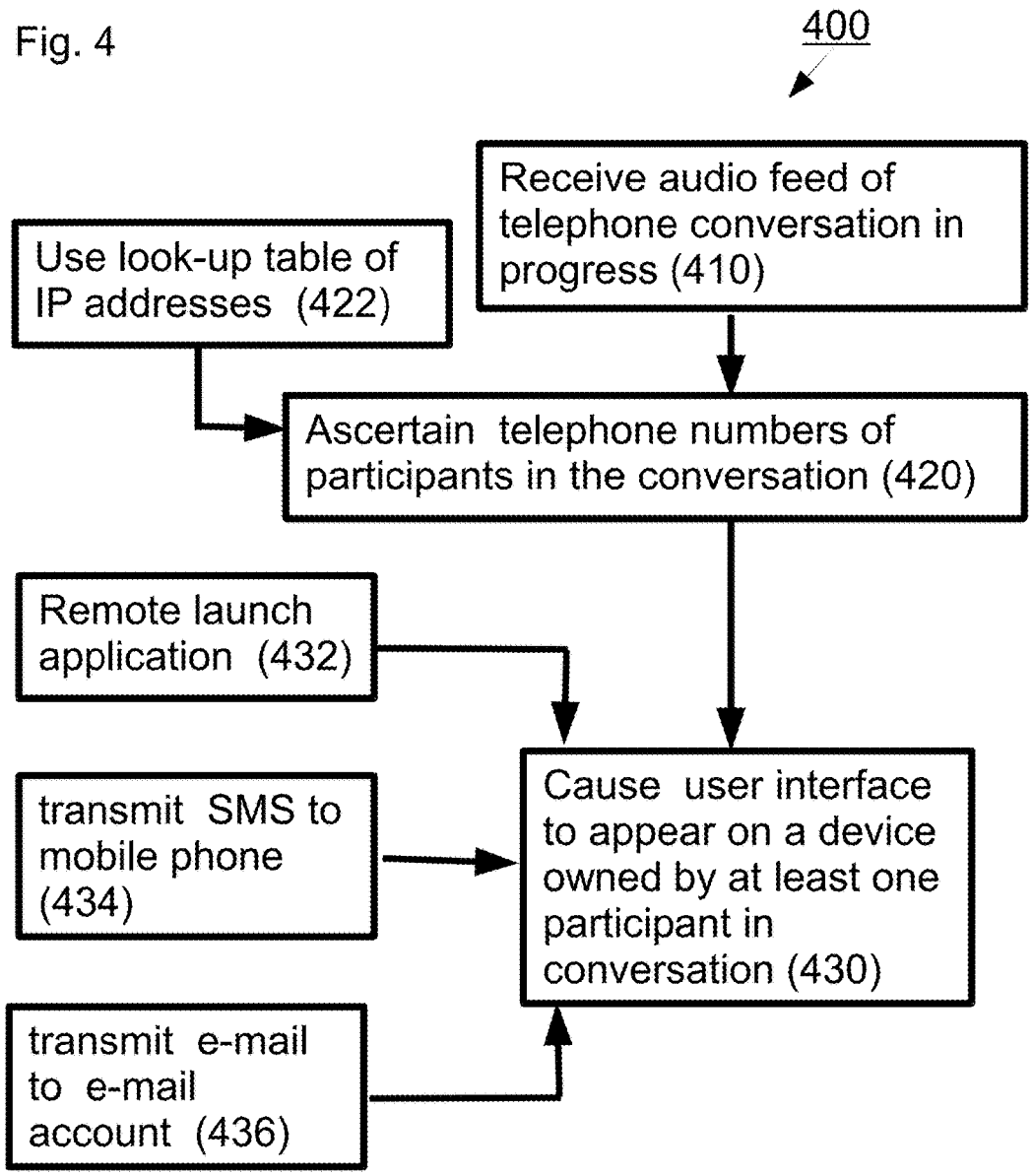
FIG. 4 is a simplified flow diagram of a method according to some exemplary embodiments of the invention.

FIG. 4 is a simplified flow diagram of a verification method, indicated generally as 400, according to some exemplary embodiments of the invention.

Depicted exemplary method 400 includes receiving 410 (e.g. at a compliance server 210; FIG. 2) an audio feed of a telephone conversation in progress, ascertaining 420 the telephone numbers of participants in the conversation and causing 430 a user interface to appear on a device owned by at least one of the participants in the conversation.

In some embodiments, of method 400 ascertaining 420 includes using 422 a look-up table of IP addresses associated with telephone numbers. According to various exemplary embodiments of the invention the IP address is of a computer which also functions as a telephone or of a computer assigned to the same person as the telephone belonging to the telephone number (i.e. the computer and the phone are at the same desk).

Alternatively or additionally, in some embodiments of method 400 causing 430 includes remote launching 432 of an application.

Alternatively or additionally, in some embodiments of method 400 causing 430 includes transmission 434 of an SMS to a mobile phone. In some embodiments, this involves using a look-up table of mobile phone numbers associated with telephone numbers.

According to these embodiments, the SMS serves as interface by accepting a yes/no answer.

Alternatively or additionally, in some embodiments of method 400 causing 430 includes 436 transmission of an e-mail message to an e-mail account. In some embodiments, this involves using a look-up table of e-mail addresses associated with telephone numbers.

Exemplary User Interfaces for Verification

FIG. 4 refers to "causing a user interface to appear on a device". FIGS. 5*a*-5*d* present exemplary user interfaces for use in that context.

FIG. 5*a* is an exemplary verification dialog box, indicated as 500, for a first party in a transaction according to an exemplary embodiment of the invention. Dialog box 500 presents data on the second party and the specific trade being discussed as determined by the system (e.g. 200 of FIG. 2) and asks for verification using Yes/No radio buttons.

FIG. 5*b* is an exemplary verification dialog box for a second party, indicated as 502, in a transaction according to an exemplary embodiment of the invention. Dialog box 502 presents data on the first party and the specific trade being discussed as determined by the system (e.g. 200 of FIG. 2) and asks for verification using Yes/No radio buttons. Dialog boxes 500 and 502 together provide "mutual verification" if both elicit a "yes" answer.

If either dialog box 500 or 502 elicits a "no" answer, a dialog box with more response options is provided.

FIG. 5c is an exemplary verification dialog box, indicated as 504, with multiple choice format according to an exemplary embodiment of the invention. Dialog box 504 separates identification of the trade from identification of the participant. Participants are presented as a multiple choice list including a "none of the above" choice. If dialog box 504 elicits a "no" or "none of the above answer, a dialog box with more response options is provided.

FIG. 5d is an exemplary verification dialog box, indicated as 506, with free text fields according to an exemplary embodiment of the invention. Free text field 508 is for entry of the name of the trade being negotiated and free text field 510 of for the name of the person on the other side of the telephone conversation.

Exemplary Verification Logic

Figure 6:
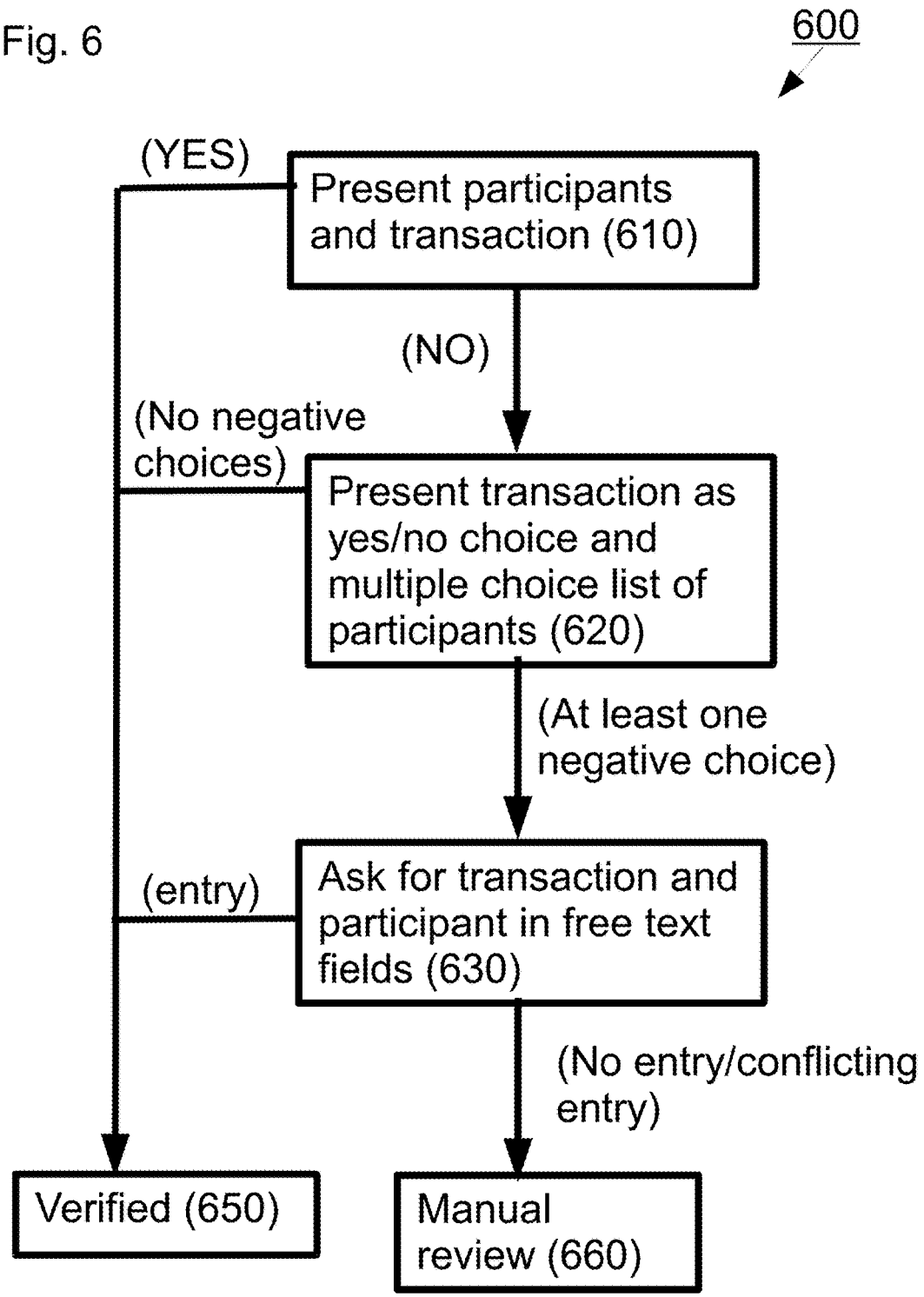
FIG. 6 is an exemplary logic tree for verification according to one exemplary embodiment of the invention.

FIG. 6 is an exemplary logic tree for verification, indicated generally as 600, according to one exemplary embodiment of the invention. According to various exemplary embodiments of the invention one, or both, participants in a conversation are queried according to the same logic.

At 610 a participant in a conversation is presented with participant(s) and a transaction and asked whether the information is correct (see FIG. 5a and/or 5b).

A "Yes" answer results in verification 650. A "No" answer brings up a new dialog box which presents 620 the transaction identifier in a Yes/No format and a multiple choice list of names including a "None of the above" option. If the user makes no negative choices, the information is considered verified 650.

If the user makes at least one negative choice, a new dialog box which asks 630 for entry of a transaction and participant name in free text fields is presented. If data is entered, the information is considered verified 650.

If the user enters no data, or enters data which conflicts with other information in the system (e.g. data entered by the other party to the conversation) a manual review 660 of the conversation is undertaken. In some embodiments, manual review 660 is by personnel at listening stations equipped with earphones (e.g. at compliance center 110 and/or institution 120 and/or institution 130). According to various exemplary embodiments of the invention such personnel listen to audio streams 124 and/or 134 during the telephone conversation and/or to recordings stored at 250 and/or 330. Alternatively or additionally, manual 660 is conducted on text output 236 from converter 234.

Although logic tree 600 is discussed in the context of dialog boxes, similar logic can be implemented using SMS (small message service), IM (instant messaging) or e-mail messages.

Figure 7:
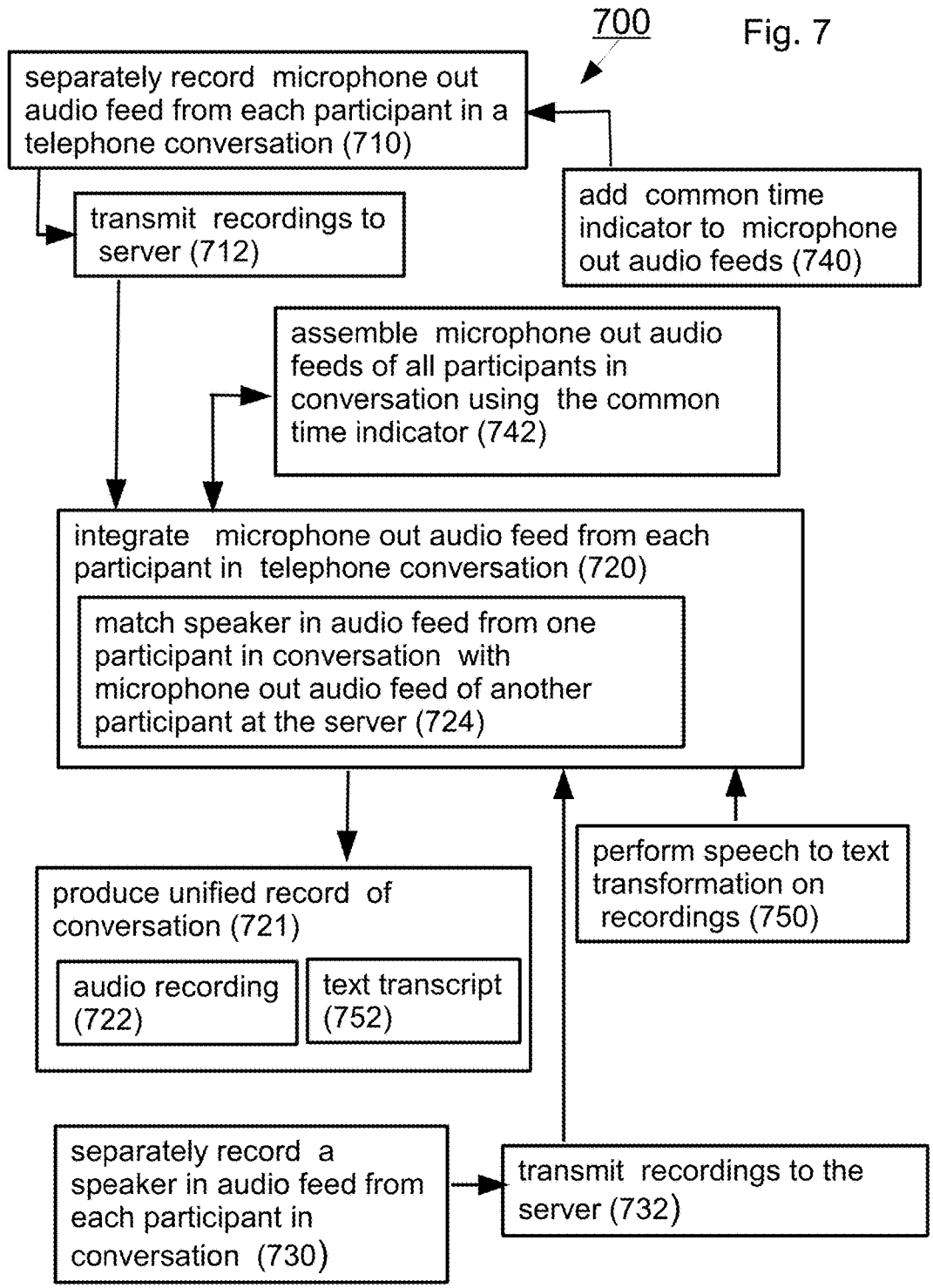
FIG. 7 is a simplified flow diagram of a method according to some exemplary embodiments of the invention.

FIG. 7 is a simplified flow diagram of a method for producing a unified record of a conversation according to some exemplary embodiments of the invention indicated generally as 700.

Depicted exemplary method 700 includes separately recording 710 a microphone out audio feed from each participant in a telephone conversation and transmitting 712 the recordings to a server. Use of microphone out audio feeds contributes to an increase in clarity of the recording. In some embodiments, recording 710 includes analog to digital conversion (ADC), using appropriate hardware, Optionally, ADC facilitates transmitting 712.

Depicted exemplary method 700 also includes integrating 720 the microphone out audio feed from each participant in the telephone conversation to produce a unified record 721 of the telephone conversation. The microphone out audio feeds correspond to 123 and 124 in FIG. 1. According to various exemplary embodiments of the invention unified record 721 includes an audio recording 722 and/or a text transcript. In some exemplary embodiments of the invention, unified record 721 includes an audio recording 722.

In some exemplary embodiments of the invention, method 700 includes separately recording 730 a speaker in audio feed from each participant in the telephone conversation and transmitting 732 the recordings to the server. In some embodiments recording 730 includes ADC using appropriate hardware. Optionally, ADC facilitates transmitting 732.

In some embodiments integrating 720 includes matching 724 a speaker in audio feed from one participant in the telephone conversation with a microphone out audio feed of another participant at the server. In some embodiments speaker out and mic in are recorded on both sides as well as an integrated version on each side for a total of six recordings which are transmitted to the server. Optionally, this redundancy contributes to a reduction in errors in unified record 721 and/or an increase in clarity of unified record 721.

In some embodiments method 700 includes adding 740 a common time indicator to the microphone out audio feeds from each participant in the telephone conversation. According to these embodiments integrating 720 includes assembling 742 microphone out audio feeds of all participants in the conversation using sequential assembly of the common time indicator.

Alternatively or additionally, in some embodiments method 700 includes performing 750 a speech to text transformation on the recordings so that unified record (721) includes a text transcript 752. For example, according to various exemplary embodiments of the invention speech to text transformation 750 is performed during integration 720 or prior to transmission 710.

FIG. 8a is a simplified schematic representation of a computer system which generates a graphic representation (i.e. on a display screen) of content of a conversation according to some exemplary embodiments of the invention indicated generally as 800.

Depicted exemplary system 800 includes an assignment module 810 configured to receive a microphone out audio feed 801 from at least one participant in a telephone conversation and assign a conversation type 811 to the conversation. Configuration of module 810 includes providing speech recognition capability and/or speech to text capability and/or analysis (e.g. natural language recognition; NLR) of speech and/or text. Assignment of conversation type 811 is based upon this analysis.

Depicted exemplary system 800 also includes a template generation module 820 adapted to retrieve a template 821 from a template database 822 based on conversation type 811 and present said template to all participants in said conversation during said conversation. Presentation is typically made on display screens. In some embodiments use of templates 821 contributes to an ability of participants in a conversation to visually apprehend the contents of the conversation. For example, conversations related to financial transactions can be divided into a small number of categories, each with a relatively small number of associated data items. Display of template 821 allows users to see the nature of the transaction. As the template is filled (see below) the details of the transaction are visually confirmed to the participants in the conversation.

Depicted exemplary system 800 also includes a template filling module 830 configured to receive the microphone out audio feed 801 from at least one participant in the telephone conversation and populate fields in the template with details from the conversation prior to conclusion of said conversation. Configuration of module 830 includes providing speech recognition capability and/or speech to text capability and/or analysis (e.g. natural language recognition; NLR) of speech and/or text. Population of fields in template 821 is based upon this analysis.

In some embodiments assignment module 810 is configured to receive microphone out audio feeds 801 from two or more participants in the telephone conversation and compare them before assigning conversation type 811. In cases where different audio feeds suggest different conversation types a clarification request is provided to one or more participants in the conversation on their display screen. In the event that no clarification requests are answered (or conflicting answers are provided), system 800 shows each participant template 821 for the apparent conversation type based upon their microphone out audio feed 801. If the issue is not resolved during the conversation, the system logs the discrepancy and reports it to supervisory personnel (e.g. using a GUI on a supervisor's screen).

In some embodiments system 800 includes a confirmation engine 840 adapted to whisper 841 at least one of the details from the conversation to at least one of the participants prior to conclusion of the conversation and request confirmation. According to various exemplary embodiments of the invention confirmation is made by pressing a key on the telephone (or keyboard or onscreen virtual keypad) or clicking on an onscreen message or a pop-up message on a display screen. Adaptation of confirmation engine 840 may include, for example, provision of text to speech capabilities. According to these embodiments of the invention, confirmation engine 840 "reads" details from fields in template 821 to one or more participants in the conversation as whispers 841 to elicit confirmation.

Alternatively or additionally, in some embodiments confirmation engine 840 requires input from two or more participants in the conversation. According to various exemplary embodiments of the invention this confirmation is via whispers 841 and/or using onscreen prompts as depicted in FIGS. 5a to 5d and described hereinabove.

Figure 8B:
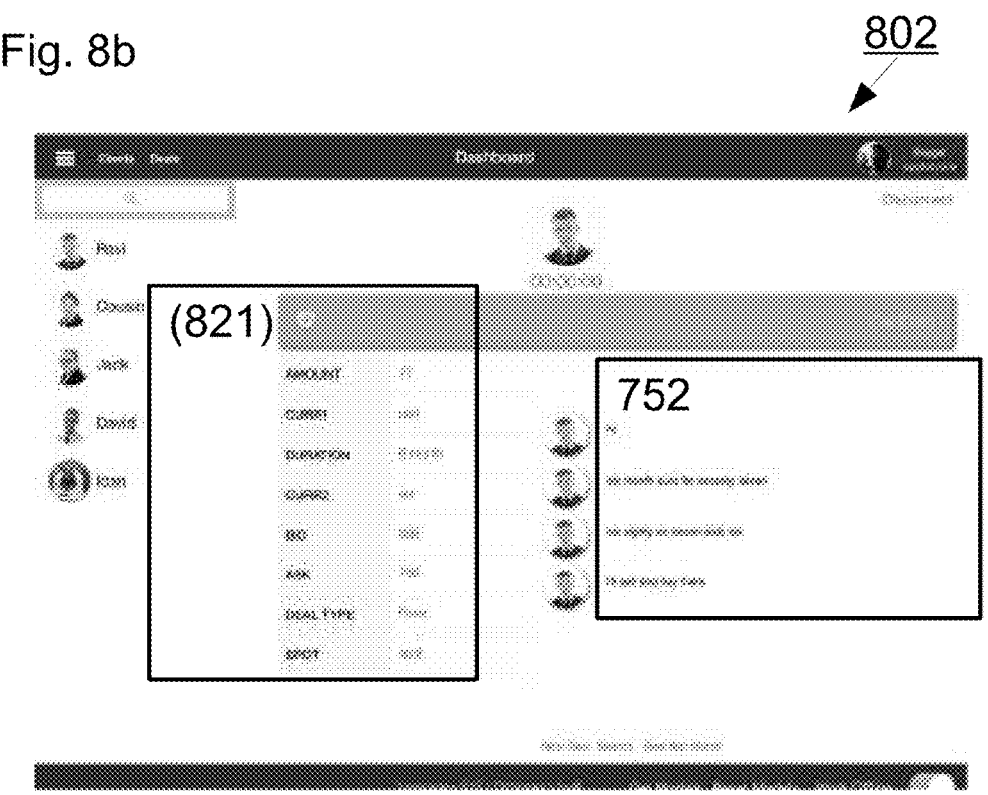
FIG. 8b is an exemplary graphical user interface (GUI) according to some embodiments of the invention.

FIG. 8b is an exemplary graphical user interface (GUI) produced by system 800 according to some embodiments of the system indicated generally as 802.

GUI 822 is depicted in a filled state at the end of the conversation. In the depicted embodiment template 821 appears on the left and text transcript 752 appear on the right.

System 800 creates the GUI as follows:

Text transcript (752) "six month euro for 77" is perceived by assignment module 810 as indicative of a "Forex Spot" trade (conversation type 811).

Template generation module 820 retrieves the relevant template from DB 822 and displays it to participant(s) in the conversation. When initially displayed only the "deal type" fields (Forex and Spot) are populated.

Template filling module 830 analyzes "six month euro for 77" and populates the amount field with "77"; duration field with "6 month"; and CURR2 field with "euro".

Template filling module 830 then analyzes six eighty six seven sixty six and populates the bid and ask fields with "686" and "766" respectively.

At this point all the fields in template 821 are populated. "I'll sell and buy there" closes the deal.

Figure 9A:
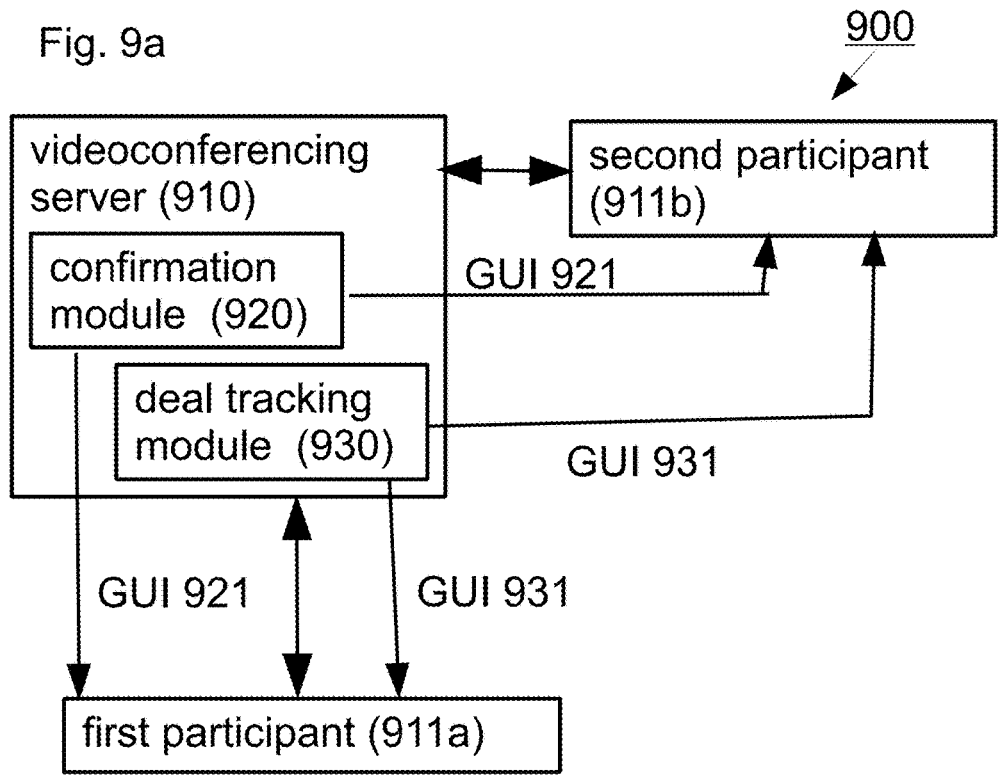
FIG. 9a is a simplified schematic representation of a computer system according to some exemplary embodiments of the invention.

FIG. 9a is a simplified schematic representation of a computer system which incorporates deal confirmation (or non-confirmation) into conclusion of va telephone call according to some exemplary embodiments of the invention indicated generally as 900.

Depicted Exemplary System 900 includes a videoconferencing server 910 in concurrent communication with all participants (two participants 911a and 911b are depicted for clarity although a larger number can be accommodated) in a telephone conversation pertaining to a transaction. In some embodiments each participant 911 uses a "soft" telephone on a computer equipped with a display, microphone and speakers (e.g. a "Madonna headset").

Depicted Exemplary System 900 also includes a confirmation module 920 which provides a graphical user interface (GUI) 921 that includes (i) one disconnect icon indicating transaction completed (922 FIG. 9b) and (ii) another disconnect icon indicating transaction not completed (923 FIG. 9b) to at least one of participants 911 in the conversation.

In some embodiments GUI 921 is presented to all of participants 911.

In some embodiments if one participant disconnects icons 922 and 923 change on the screen(s) of remaining participant(s) to indicate "deal complete" and "NO DEAL" respectively (not depicted).

In the event that conflicting information is provided via GUI 921 (i.e. at least one participant disconnects using icon 922 and at least one participant disconnects using icon 923) system 900 logs the discrepancy and reports it to supervisory personnel (e.g. using a GUI on a supervisor's screen).

In the depicted embodiment system 900 includes a deal tracking module 930 designed and configured to offer an opportunity to complete a transaction by providing a graphical user interface (GUI) 931 including: (i) one call icon indicating pending transaction (depicted as menu 932 in FIG. 9c) to a user initiating a call to a contact with whom the user has an incomplete transaction pending and (ii) another call icon indicating new transaction (depicted as "new trade" 935 in FIG. 9c).

Figure 9B:
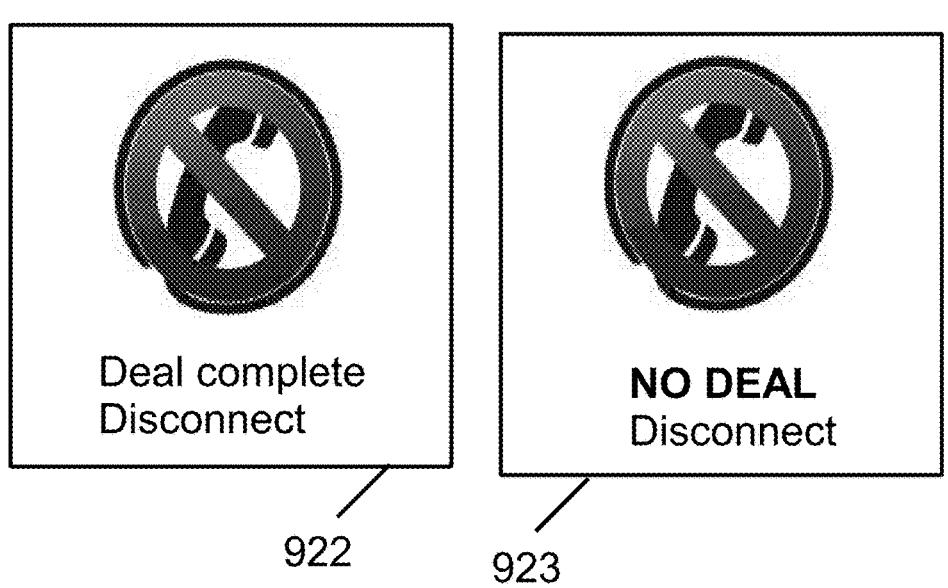
FIG. 9b is an exemplary graphical user interface (GUI) according to some embodiments of the invention.

FIG. 9b is an exemplary graphical user interface (GUI) 921 according to some embodiments of the invention. Depicted (GUI) 921 that includes one disconnect icon 922 indicating transaction completed and another disconnect icon 923 indicating transaction not completed.

Figure 9C:
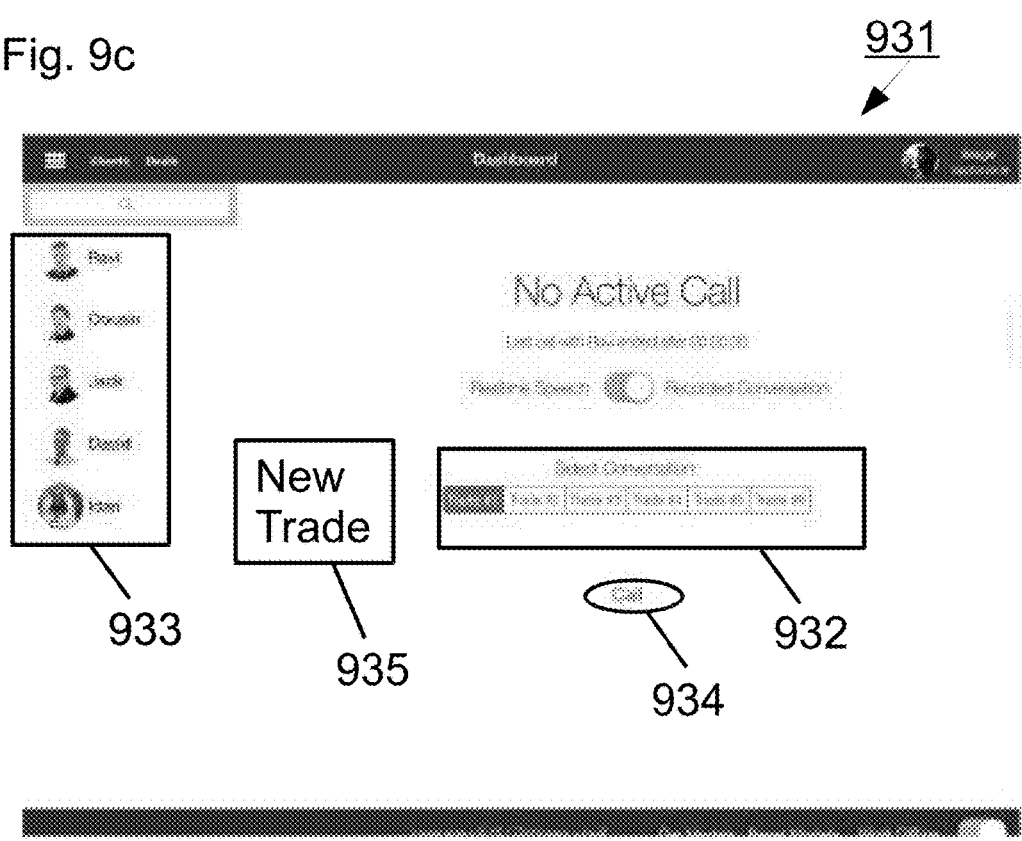
FIG. 9c is an exemplary graphical user interface (GUI) according to some embodiments of the invention.

FIG. 9c is an exemplary graphical user interface (GUI) 931 according to some embodiments of the invention. Depicted exemplary GUI 931 includes icons 932, 933, 934 and 935.

Icon 932 is a menu indicating pending transactions (Trades 1-5 in this example). A user selects a pending transaction (trade) and then clicks call icon 934 to resume communication with the relevant party.

Icon 935 is a new trade icon. In some embodiments pressing icon 935 highlights contact list 933. Selection of a person from list 933 initiates a call to the selected person concerning a new matter.

Exemplary UID Formats

Unique identifiers (UIDs) 242 can have different formats in different embodiments of the invention. For purposes of illustration only, some possible formats are presented here.

These formats employ components such as, but not limited to transaction names (e.g. industry accepted uniform transaction identifiers), Institutional identifiers (e.g. NASDAQ 3 letter or 4 letter codes), date stamp (e.g. mm/dd/ yyyy), time stamp (e.g. hr/min in the eastern time zone) and serial number of conversation related to a specific transaction. According to various exemplary embodiments of the invention these components are presented in different orders and/or in different combinations. As used in this specification and the accompanying claims the term "industry accepted uniform transaction identifiers" indicates nomenclature either imposed upon the financial industry (or a sector thereof) by a regulatory agency or agreed upon by participating financial institutions. In cases where no standardized nomenclature is in place, the system provides a same transaction name to both parties in the transaction for use as part of the UID for all communications associated with that transaction.

One exemplary format is:

[transaction name][date stamp][time stamp]

This format has the advantage of being short and of automatically presenting all conversations related to a specific transaction in chronological order (either ascending or descending).

Another exemplary format is [institutional identifier of initiator of call][transaction name][institutional identifier of recipient of call][date stamp][time stamp]

This format is longer but adds information about which party pursued the other party at various stages of the negotiation. Like the previous format it allows automatically presenting all conversations related to a specific transaction in chronological order (either ascending or descending) if appropriate sort instructions are given.

A third exemplary format is:

[transaction name][serial number of conversation related to the transaction]

This format is short and makes it easy to detect if relevant conversations are deleted from a list.

Exemplary Use Scenarios

Various exemplary embodiments of the invention described throughout this application are expected to find utility, for example, in the context of swap transactions, mortgage negotiations, futures trading, complex trades, trade union agreement negotiations and talent negotiations (e.g. actors or sports professionals) or any other transaction type.

Exemplary Advantages

According to various exemplary embodiments of the invention information pertaining to details of a financial transaction "closed" (or not "closed") in a telephone conversation are collected and maintained for future reference. Advantages of such a practice include, but are not limited to, resolution of future disputes between parties to the transaction concerning the transaction details and/or assisting parties to the transaction in complying with applicable regulations.

In some exemplary embodiments of the invention, presentation of dialog boxes (FIGS. 5a-5d and accompanying descriptive text) to participants in a conversation during, or just after, the conversation contributes to collection of accurate information in a timely manner.

Alternatively or additionally, in some embodiments transaction details are logged automatically (e.g. template 821 in FIG. 8). This type of embodiment generates a record of transaction details without active user input. Alternatively or additionally, presentation of a visual record of the transaction in progress contributes to an ability of participants to evaluate the transaction.

Alternatively or additionally, in some embodiments final transaction status is confirmed by one or more participants in a conversation as part of a standard "disconnect call" action (see FIG. 9b and accompanying explanation). This type of embodiment provides manually confirmation without being perceived as extra effort by participant(s) in the conversation.

Alternatively or additionally, in some embodiments the system (e.g. 900 in FIG. 9a) provides a menu of pending transactions (e.g. 932) to users. This type of embodiment contributes to an ability of users to monitor their progress towards completion of transactions.

Alternatively or additionally, in some embodiments provision of a "new trade" icon (935 in FIG. 9c) contributes to an ability of the system to assign a new transaction number when relevant.

Alternatively or additionally, in some embodiments confirmation of information pertaining to a conversation by all participants in the conversation serves to verify that the information recorded by each participant is consistent and/or complete.

Alternatively or additionally, in some embodiments operation of compliance center 110 contributes to a reduction in discrepancies between reports prepared by different institutions working on the same transaction(s).

Technical Character

Various exemplary embodiments improve the performance of existing telephone systems (e.g. VOIP calls made using a computer or other device equipped with a screen, microphone and speaker(s)). According to various exemplary embodiments of the invention this improved performance manifests itself as automated logging of transaction details and/or increased conformation between records kept by different institutions and/or presentation of transaction details in a visual format to participants in a conversation during the conversation.

Alternatively or additionally, various exemplary embodiments of the invention apply different analysis methods in a dynamic environment to achieve results which are not standard in the relevant technology field. The result is a breakthrough which was not previously envisioned.

Alternatively or additionally, various described modules, impart added system functionalities which improve the performance of users participating in phone conversations and/or contribute to an ability of financial institutions to comply with applicable regulations.

It is expected that during the life of this patent many communication protocols will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, components and/or actions ascribed to exemplary embodiments of the invention and depicted as a single unit may be divided into subunits (For example, various modules, engines or databases depicted may reside in a cloud). Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus or system and features used to describe an apparatus or system can be used to characterize a method.

It should be further understood that the individual features described hereinabove can be combined in all possible combinations and sub-combinations to produce additional embodiments of the invention. The examples given above are purely illustrative and are not intended to limit the scope of the invention which is defined solely claims granted as a patent.

Each recitation of an embodiment of the invention that includes a specific feature, part, component, module or process is an explicit statement that additional embodiments of the invention not including the recited feature, part, component, module or process exist.

Specifically, the invention has been described in the context of financial transactions between institutions but might also be used in the context of transactions including non-institutional participants.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A computerized system comprising:
   (a) a compliance server adapted to receive an audio feed of a telephone conversation;
   (b) an identification module adapted to compare said audio feed to a database of voice prints and identify participants in said telephone conversation; and
   (c) an analysis module adapted to ascertain a subject of said telephone conversation;
   (d) a co-ordination module which associates a unique identifier (UID) with each audio stream and transmits said UID to at least one institution represented in said telephone conversation;
   (e) a co-ordination module which associates a unique identifier (UID) with each audio stream; and
   a storage module which stores said audio stream/UID pair and grants access to said pair to at least one institution represented in said telephone conversation; and
   (f) a certification engine adapted to generate a certified copy of the telephone conversation in response to a request from an institution that participated in the conversation.

2. A system according to claim 1, wherein said telephone conversation is in progress.

3. A system according to claim 1, wherein said telephone conversation has been concluded.

4. A system according to claim 1, wherein said analysis module analyzes the audio feed directly.

5. A system according to claim 4 wherein said analysis module relies exclusively on microphone out audio feeds.

6. A system according to claim 1, comprising a speech to text converter which converts said audio stream to a text output.

7. A system according to claim 6, wherein said analysis module analyzes said text output to ascertain said subject of said telephone conversation.

8. A system according to claim 1, comprising:
   a verification module adapted to require at least one participant in said telephone conversation to identify the other participant(s) in the conversation and the subject of the conversation.

9. A computerized system comprising:
   (a) a compliance server adapted to receive an audio feed of a telephone conversation;
   (b) an identification module adapted to compare said audio feed to a database of voice prints and identify participants in said telephone conversation; and
   (c) an analysis module adapted to ascertain a subject of said telephone conversation;
   (d) a co-ordination module which associates a unique identifier (UID) with each audio stream and transmits said UID to at least one institution represented in said telephone conversation;
   (e) a query engine adapted to provide a response to a query containing a UID, wherein said query engine is adapted to generate a hierarchical listing of all records associated with a specific UID.

10. A system according to claim 1 comprising:
    a template generation module adapted to retrieve a template from a template database based on said subject of said conversation and present said template to all participants in said conversation during said conversation; and
    a template filling module configured to receive audio feed from at least one participant in said telephone conversation and populate fields in said template with details from said conversation prior to conclusion of said conversation.

11. A system according to claim 9, wherein said UID indicates a transaction.

* * * * *